(12) United States Patent
Hisamoto

(10) Patent No.: US 11,044,411 B2
(45) Date of Patent: Jun. 22, 2021

(54) IMAGING ELEMENT AND IMAGING APPARATUS

(71) Applicant: CANON KABUSHIKI KAISHA, Tokyo (JP)

(72) Inventor: Shinji Hisamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/888,212

(22) Filed: Feb. 5, 2018

(65) Prior Publication Data

US 2018/0234605 A1 Aug. 16, 2018

(30) Foreign Application Priority Data

Feb. 10, 2017 (JP) .............................. JP2017-022782
Nov. 27, 2017 (JP) .............................. JP2017-227175

(51) Int. Cl.
*H04N 5/235* (2006.01)
*H04N 5/243* (2006.01)

(52) U.S. Cl.
CPC ......... *H04N 5/2352* (2013.01); *H04N 5/2351* (2013.01); *H04N 5/2353* (2013.01); *H04N 5/243* (2013.01)

(58) Field of Classification Search
CPC .... H04N 5/2352; H04N 5/2351; H04N 5/243; H04N 5/2353; G03B 7/00–28; G03B 2207/00–005
See application file for complete search history.

(56) References Cited

U.S. PATENT DOCUMENTS

| 2003/0117519 A1* | 6/2003 | Wakabayashi | ....... H04N 5/2352 348/364 |
| 2006/0056684 A1* | 3/2006 | Kurane | ................. H04N 1/4072 382/162 |
| 2008/0151086 A1* | 6/2008 | Nakayama | ........... H04N 5/2351 348/296 |
| 2008/0284871 A1* | 11/2008 | Kobayashi | ............. H04N 5/145 348/229.1 |

(Continued)

FOREIGN PATENT DOCUMENTS

| CN | 106027914 A | 10/2016 |
| JP | 2009-296353 A | 12/2009 |
| JP | 2016-184874 A | 10/2016 |

OTHER PUBLICATIONS

The above foreign patent document was cited in a Apr. 15, 2020 Chinese Office Action, which is enclosed with an English Translation, that issued in Chinese Patent Application No. 20180136488.9.

*Primary Examiner* — Abdelaaziz Tissire
(74) *Attorney, Agent, or Firm* — Cowan, Liebowitz & Latman, P.C.

(57) ABSTRACT

An imaging element that outputs an image signal acquired by an imaging unit which has a plurality of pixel units is provided that includes a gain unit that sets gain with respect to an output signal of the imaging unit; a control unit that controls an accumulation time of the pixel units; and an arithmetic operation unit that receives a target luminance value and exposure control information, calculates the gain or the accumulation time by detecting a luminance value using an image signal read from the pixel units, and causes the gain unit or the control unit to perform exposure control of the imaging unit.

15 Claims, 11 Drawing Sheets

(56) References Cited

U.S. PATENT DOCUMENTS

| | | | |
|---|---|---|---|
| 2010/0238331 A1* | 9/2010 | Umebayashi | H01L 27/14627 348/294 |
| 2013/0146750 A1* | 6/2013 | Maeda | H01L 27/14601 250/208.1 |
| 2013/0221470 A1* | 8/2013 | Kinsman | H01L 27/14618 257/434 |
| 2014/0077063 A1* | 3/2014 | Cho | H01L 27/14634 250/208.1 |
| 2014/0078358 A1* | 3/2014 | Takenaka | H04N 5/2357 348/294 |
| 2014/0125972 A1* | 5/2014 | Namba | H04N 5/2355 356/213 |
| 2014/0184866 A1* | 7/2014 | Ogushi | H04N 5/23212 348/308 |
| 2015/0002715 A1* | 1/2015 | Ise | H04N 5/23212 348/308 |
| 2015/0181095 A1* | 6/2015 | Yamaguchi | H04N 5/2352 348/229.1 |
| 2016/0366324 A1* | 12/2016 | Nakata | H04N 5/2352 |
| 2018/0035034 A1* | 2/2018 | Nakata | H04N 5/238 |
| 2018/0115724 A1* | 4/2018 | Motonaga | H04N 5/2355 |
| 2018/0115729 A1* | 4/2018 | Ise | H04N 5/23245 |
| 2019/0068909 A1* | 2/2019 | Kaibara | G01S 11/12 |

* cited by examiner

IMAGING ELEMENT AND IMAGING APPARATUS

FIELD OF THE INVENTION

The present invention relates to an imaging element with a function of an exposure arithmetic operation and an imaging apparatus that uses the sensor.

DESCRIPTION OF THE RELATED ART

There are imaging apparatuses with a so-called live view function with which captured images are sequentially displayed, such as lens interchangeable cameras. In a case in which an interchangeable lens used for capturing moving images is mounted in a main body of an imaging apparatus and used, the aperture thereof can be smoothly driven in many stages during capturing of a moving image. In addition, in a case in which an interchangeable lens for capturing still images is mounted in a main body of an imaging apparatus and used, the aperture thereof is drive-controlled in a smaller number of stages. In this case, since the number of stages of drive control of the aperture is small, there is a possibility that, if time is taken to perform drive control, it will be hard to promptly respond to a change of exposure. Control of the aperture is performed at a timing different from a timing at which an electronic shutter and gain of an imaging element is set. This may cause flickering on an image attributable to a difference in exposure between frames. The publication of JP 2016-184874A discloses an imaging apparatus which adjusts an exposure amount of image data by amplifying a pixel signal, which is generated by an imaging element, and changing an aperture of an aperture and an amplification rate.

In addition, there are digital cameras with a function of capturing moving images having a high frame rate of 1000 frames per second (fps). As load ratios and memory bandwidths of arithmetic processing units (CPUs) of imaging apparatuses increase due to digital cameras with high functionality, there is concern of exposure calculation processes performed by CPUs not being completed within a time between frames. Following a change of exposure becomes later if it takes time to perform an exposure calculation process, and thus there is a possibility of the number of frames in an exposure state, which may cause flickering in an image, increasing. The publication of JP 2009-296353A discloses a process in which image information of an imaging element is added for each color of color filters and the addition value is transmitted to a CPU. An exposure control process of the CPU can be sped up by shortening a time taken to perform an image data transmission process.

In Japanese Patent Laid-Open No. 2016-184874, luminance of an object is calculated from image information read from an imaging element and gain thereof is controlled following a change of an aperture on the basis of the calculation result. In a case in which a aperture abruptly changes with respect to a still image photographing lens, however, a time at which image information is read does not match a timing at which the aperture changes, it is hard to catch up with control of gain, and thus there is a possibility of flickering occurring.

In Japanese Patent Laid-Open No. 2009-296353, information of an image captured by the imaging element is added and output to the outside, an amount of data transmitted between the imaging element and the CPU is reduced, and thereby control of exposure is sped up. However, after the CPU receives the addition value, an arithmetic operation for electronic shutter and gain is necessary depending on a program diagram, and a delay of the exposure calculation process is a concern when high-speed drive is needed for a moving image with a high frame rate, or the like. In addition, since no measure is taken for a change of the aperture, flickering may occur in images.

SUMMARY OF THE INVENTION

The present invention provides an imaging element which controls exposure and an imaging apparatus which can reduce an amount of an exposure control process of an arithmetic processing unit using the imaging element.

According to an aspect of the present invention, an image processing apparatus that outputs an image signal acquired by an imaging unit which has a plurality of pixel units is provided that includes a gain unit that sets gain with respect to an output signal of the imaging unit; a control unit that controls an accumulation time of the pixel units; and an arithmetic operation unit that receives a target luminance value and exposure control information, calculates the gain or the accumulation time by detecting a luminance value using an image signal read from the pixel units, and causes the gain unit or the control unit to perform exposure control of the imaging unit.

According to the present invention, an amount of an exposure control process of an arithmetic processing unit can be reduced by using an imaging element which controls exposure.

Further features of the present invention will become apparent from the following description of exemplary embodiments (with reference to the attached drawings).

DESCRIPTION OF THE EMBODIMENTS

As embodiments of the present invention, an imaging element which can cope with an increase in an amount of a processing load or a memory bandwidth of an arithmetic processing unit of an imaging apparatus with high functionality, and the imaging apparatus will be described in detail below. Due to an increase in an amount of processing load or a memory bandwidth caused by an increase in the number of pixels of an imaging element or the like, following a change of exposure becomes later if time is taken to perform an exposure calculation process, which causes flickering in an image. An amount of an exposure control process of the arithmetic processing unit can be reduced and a change of exposure caused by control of an aperture that may cause flickering can be minimized according to each of the embodiments.

First Embodiment

Figure 1:
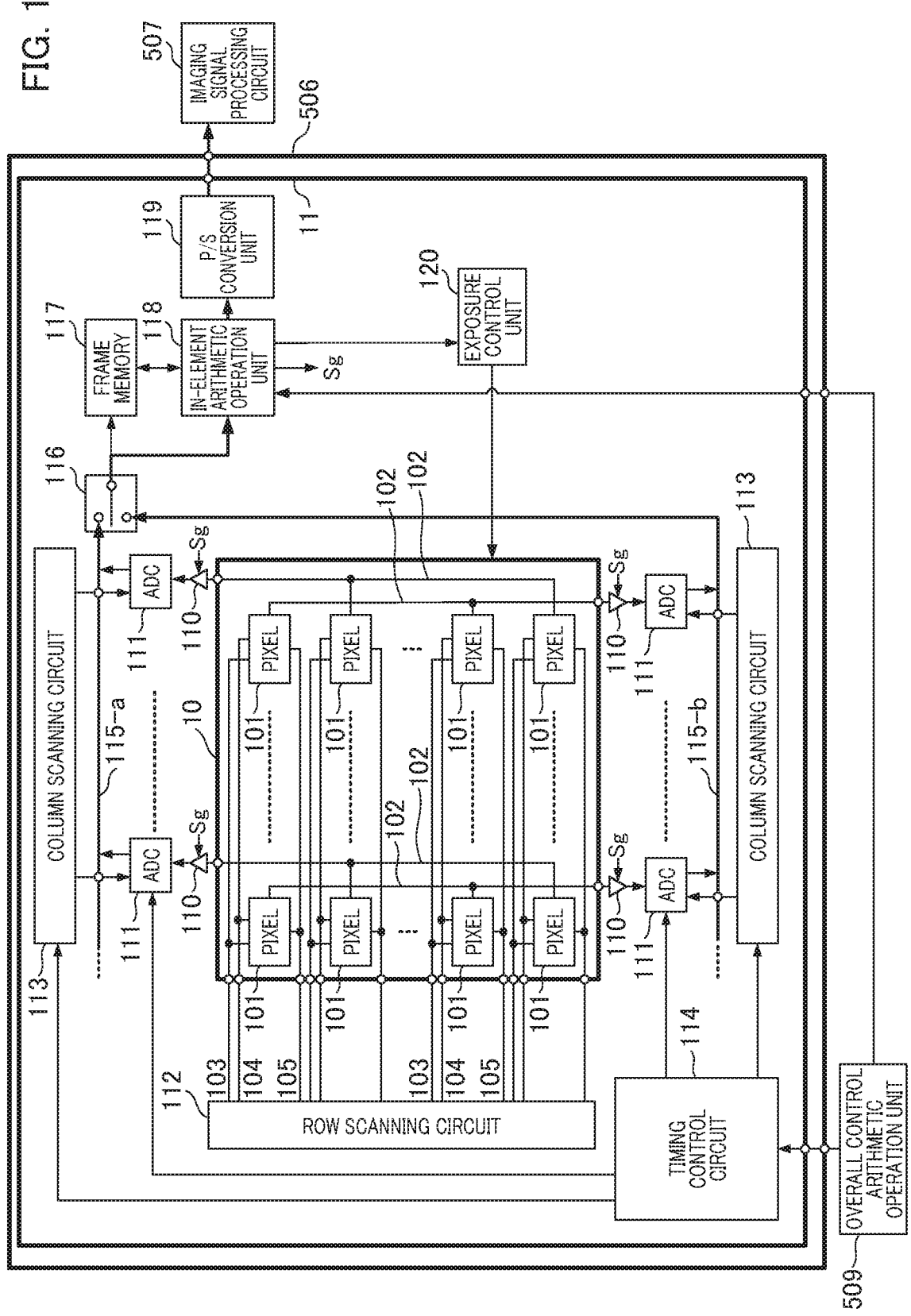
FIG. 1 is a schematic structure diagram illustrating an imaging element according to an embodiment of the present invention.

FIG. 1 is a schematic block diagram showing a configuration example of an imaging element according to the present embodiment. The imaging element has a configuration in which many pixel units 101 are arranged in a two-dimensional array shape. For example, the stacked type imaging element 506 has a first chip (an imaging layer) 10 and a second chip (a circuit layer) 11. An imaging signal processing circuit 507 processes an output signal of the imaging element 506. An overall control arithmetic operation unit 509 is a core unit which controls the imaging element 506 and other constituent units included in the imaging apparatus. Although the imaging signal processing circuit 507 and the overall control arithmetic operation unit 509 are provided as separate constituent units in the present embodiment, the invention is not limited thereto, and the units may be included in the same circuit that includes a CPU.

Respective vertical output lines 102, transferred signal lines 103, reset signal lines 104, and row selection signal lines 105 are connected to each of the pixel units 101. Gain amplifiers 110 are connected to the pixel units 101 and can set gain in accordance with a gain control signal (which will be denoted by Sg) from an in-element arithmetic operation unit 118 which will be described below. Column ADC blocks 111 output signals obtained by performing analog (A)/digital (D) conversion on a signal output from the vertical output line 102 connected to the pixel units 101 via the gain amplifiers 110. A row scanning circuit 112 is connected to the pixel units 101 by the transferred signal lines 103, the reset signal lines 104, and the row selection signal lines 105. A plurality of column scanning circuits 113 are connected to the plurality of column ADC blocks 111 by horizontal signal lines 115-$a$ and 115-$b$. A timing control circuit 114 outputs a timing control signal to each of the column ADC blocks 111 and the column scanning circuits 113 to control them. Note that, although the gain amplifiers 110 correspond to a gain unit which amplifies image signals from the pixel units 101 in the present embodiment, an amplification unit for image signals is not limited thereto. For example, signals may be amplified using conversion gain used by the column ADC blocks 111 for digital conversion, or using a digital gain circuit, which is not illustrated, after digital conversion.

A switching unit 116 switches signals from the horizontal signal lines 115-$a$ and 115-$b$ to output the signals to the frame memory 117 and the in-element arithmetic operation unit 118. A parallel/serial conversion unit (which will be denoted by a P/S conversion unit) 119 acquires output of the in-element arithmetic operation unit 118 and performs parallel/serial conversion thereon. The P/S conversion unit 119 outputs a converted signal to the imaging signal processing circuit 507.

The imaging element 506 has a structure in which the first chip 10 is stacked on the second chip 11. The first chip 10 has the plurality of pixel units 101 arranged in a matrix shape, and is disposed on a light incidence side. That is, the first chip 10 is positioned on an incidence side on which light from an object is received. The pixel units 101 are connected to the transferred signal lines 103, the reset signal lines 104, and the row selection signal lines 105 in the horizontal direction (the row direction) and to the vertical output lines 102 in the vertical direction (the column direction). Note that each of the vertical output lines 102 has different connection destinations in accordance with units of reading rows.

The second chip 11 has pixel drive circuits such as the gain amplifiers 110, the column ADC blocks 111, the row scanning circuit 112, the column scanning circuits 113, and the timing control circuit 114, the frame memory 117, the in-element arithmetic operation unit 118, and the P/S conversion unit 119 formed therein.

As described above, the imaging element 506 has the first chip 10 in which the pixel units 101 are formed and the second chip 11 in which the pixel drive circuits, the memory circuit, the arithmetic operation circuit, and the like are formed. Manufacturing processes can be divided with respect to the imaging layer and the circuit layer of the imaging element 506, and therefore fine wiring, higher speed resulting from high density, miniaturization, and high functionality of the circuit layer can be achieved. Note that some of the circuits of the second chip 11 may be provided on the first chip.

The switching unit 116 selectively outputs image signals each having a channel output from the horizontal signal lines 115-$a$ and 115-$b$ sequentially to the frame memory 117. The frame memory 117 temporarily stores the output image signals. The in-element arithmetic operation unit 118 performs arithmetic operations of exposure control within the imaging element 506, and details thereof will be described below. The P/S conversion unit 119 performs conversion on image information processed by the in-element arithmetic operation unit 118 in accordance with a timing control signal coming from the timing control circuit 114 and outputs the converted information to the imaging signal processing circuit 507 positioned outside the imaging element 506. An exposure control unit 120 controls exposure of the pixel units 101 complying with a control command of the in-element arithmetic operation unit 118.

Figure 2A:
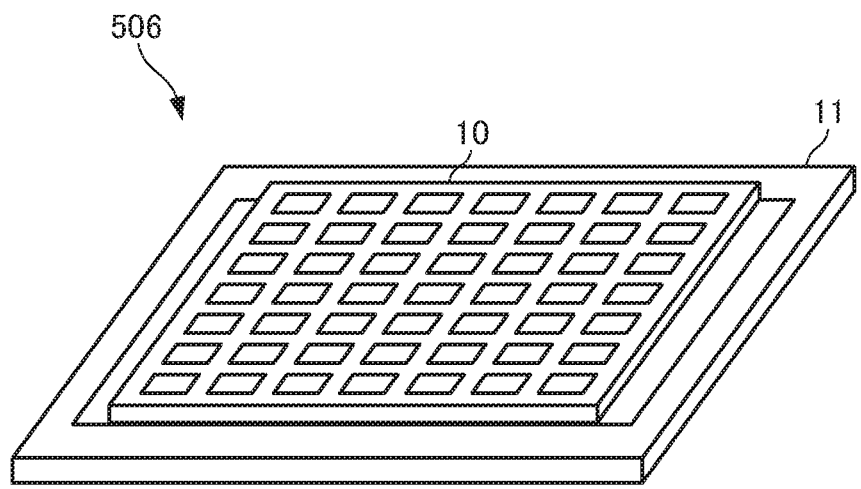
FIGS. 2A and 2B are diagrams schematically illustrating a configuration of the imaging element according to the embodiment of the present invention.
Figure 2B:
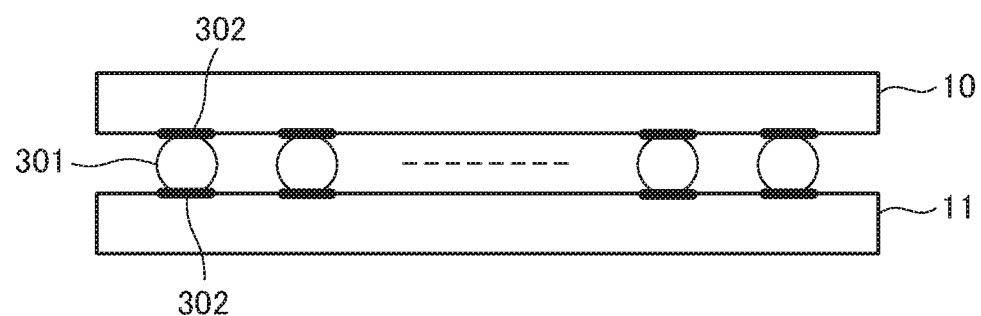

FIG. 2 is a diagram schematically showing an exterior configuration of the imaging element 506 according to the present embodiment. FIG. 2 (A) is a perspective diagram of the imaging element 506 when viewed from obliquely above the light incidence side. FIG. 2 (B) is a schematic cross-sectional diagram of the imaging element 506. The first chip 10 and the second chip 11 each have a plurality of micropads 302 and are integrated through electrical connection via a plurality of microbumps 301.

Figure 3:
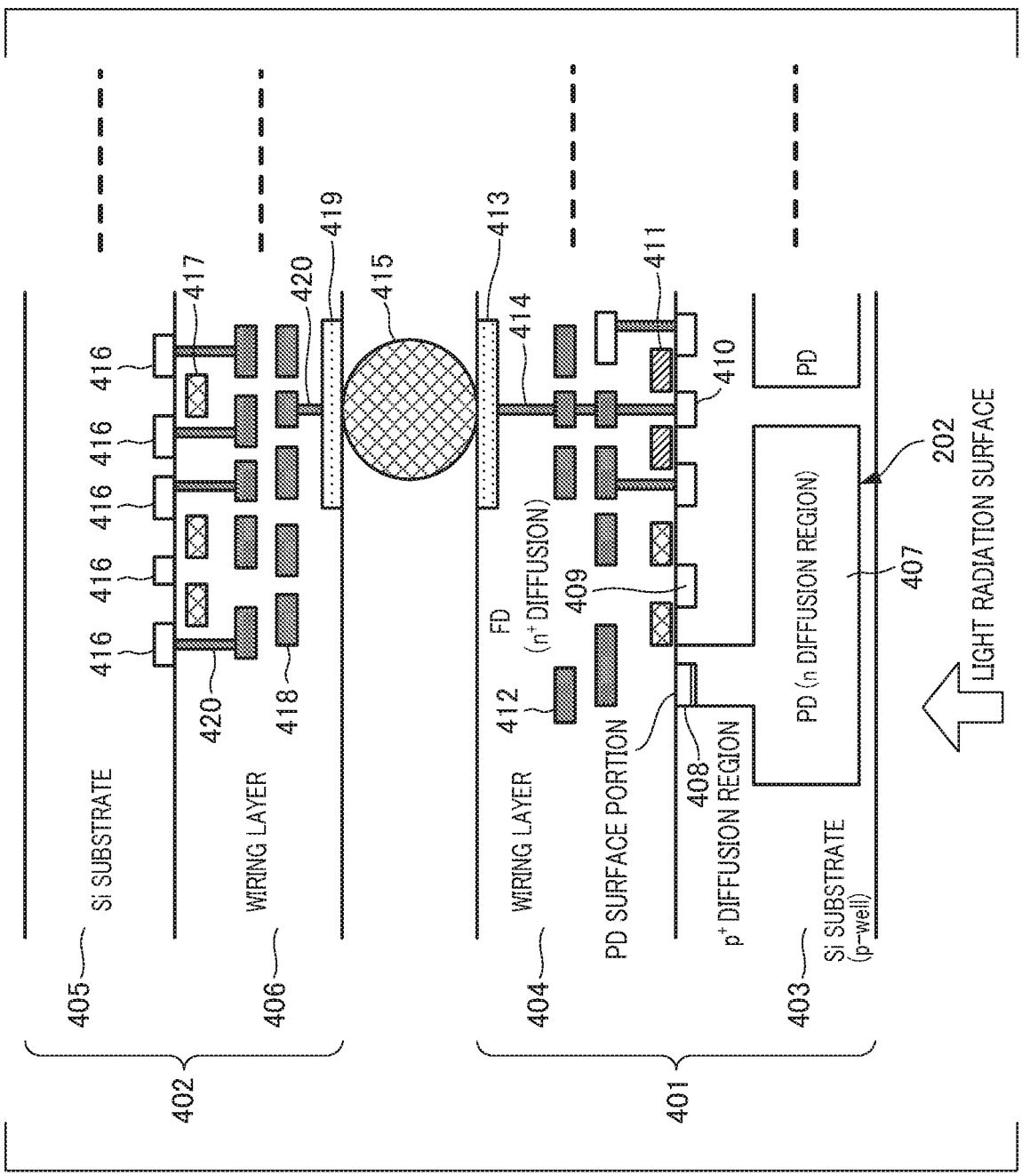
FIG. 3 is a cross-sectional diagram illustrating the imaging element according to the embodiment of the present invention.

FIG. 3 is a diagram showing a detailed cross-sectional structure of the imaging element 506. The first chip 10 is shown on the lower side and the second chip 11 is shown on the upper side of FIG. 3. That is, an imaging layer 401 corresponds to the first chip 10 and the circuit layer 402 corresponds to the second chip 11.

The imaging layer 401 has a configuration in which a wiring layer 404 is formed on a silicon (Si) substrate 403. The Si substrate 403 has n diffusion regions 407 formed therein as photodiodes (which will be denoted by PDs below) 202 and thus has a back-side illumination structure. p+ diffusion regions 408 are formed on surface portions of the PDs 202, i.e., in the boundary portions of the PDs and the wiring layer 404. A plurality of n+ diffusion regions 409 for floating diffusions (FD) and n+ diffusion regions 410 for switching transistors are formed on the surface portion of the Si substrate 403.

The wiring layer 404 has pieces of transistor gate wiring 411 and signal propagation wiring 412 formed within an insulation layer formed of silicon dioxide (SiO2) or the like. A surface portion of the wiring layer 404 has a micropad 413 made of Cu or the like formed therein. Transfer transistors, reset transistors, amplification transistors, and selection transistors are formed with the n+ diffusion regions 409, the n+ diffusion regions 410, and the transistor gate wiring 411. The wiring layer 404 has a via (VIA) hole 414 for connecting an n+ diffusion region 410 to the micropad 413.

The circuit layer 402 has a configuration in which a wiring layer 406 is formed on a Si substrate 405. Surface portions of the Si substrate 405 have a plurality of transistor diffusion regions 416 formed thereon. The wiring layer 406 has pieces of transistor gate wiring 417 and signal propagation wiring 418 formed within an insulation layer formed of SiO2 or the like. A micropad 419 formed of Cu or the like is formed on a surface portion of the wiring layer 406. The micropad 419 is connected to the micropad 413 via a microbump 415. The wiring layer 406 has via holes 420 for connecting the diffusion regions 416 and the like to the micropad 419 formed therein. Various kinds of circuits are formed with the transistor diffusion regions 416, the transistor gate wiring 417, the signal propagation wiring 418, and the like. Since details of the constituent elements are not matters directly related to the present invention, description thereof will be omitted. Although the configuration example in which the connection of the imaging layer 401 and the circuit layer 402 is made using the microbump 415 serving as a stack connection terminal is shown in FIG. 3, an embodiment in which the imaging layer 401 and the circuit layer 402 are directly connected without using a microbump is also possible.

Figure 4:
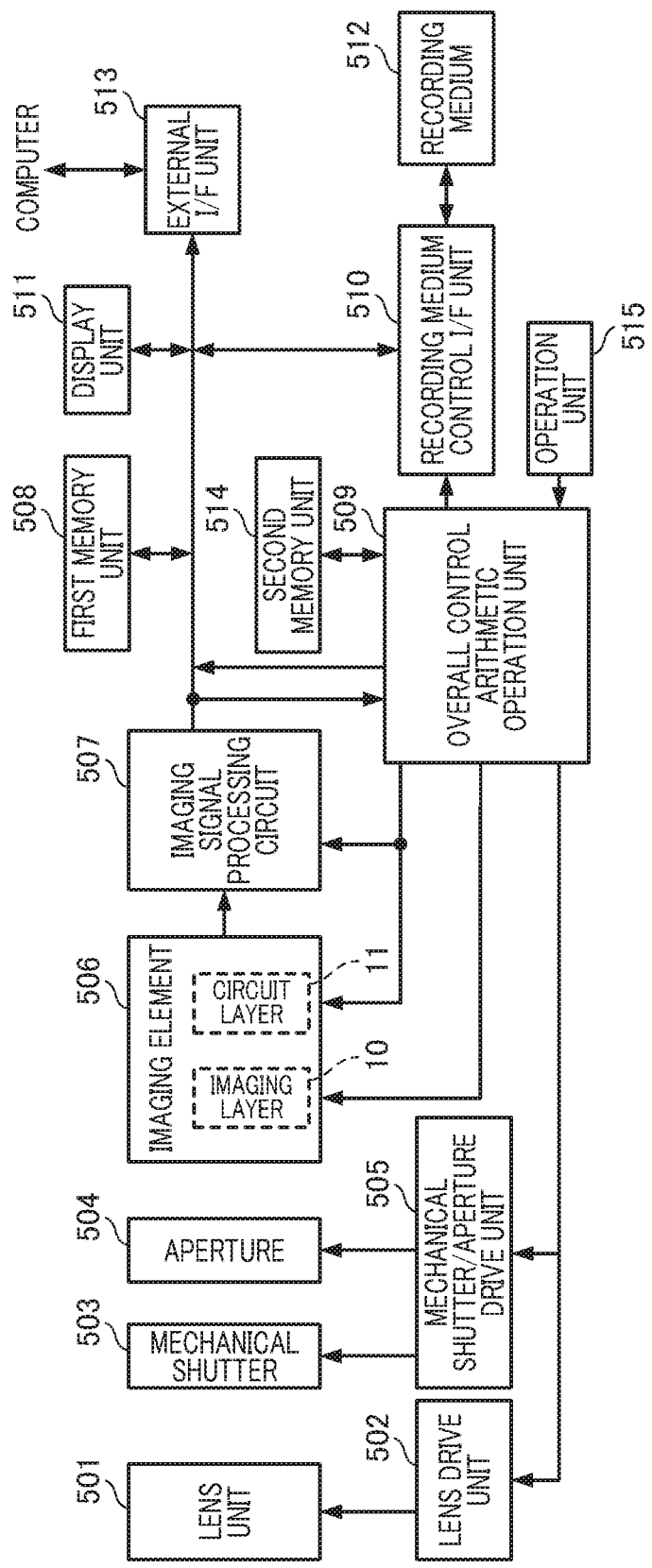
FIG. 4 is a block diagram illustrating an overview of an imaging system according to an embodiment of the present invention.

Next, an imaging system of the present embodiment will be described with reference to FIG. 4. Although the imaging system of the present embodiment is a digital camera which acquires moving images or still images as an example, the invention is not limited thereto. For example, the invention can also be applied to a surveillance camera, a mobile device such as a smartphone, a moving object such as an in-vehicle camera, and the like. FIG. 4 is a block diagram showing an overview of an imaging apparatus in which the imaging element 506 is used. A lens unit 501 includes a plurality of lenses constituting an imaging optical system. The lens unit 501 is an interchangeable lens which can be mounted in a camera main body or a lens unit integrated with the camera main body. A lens drive unit 502 drives movable lenses (such as a zoom lens and a focus lens) included in the imaging optical system. A mechanical shutter (which is denoted by mechanical shutter in the drawing) 503 is used to control exposure times, and an aperture 504 is used to control exposure amounts. A mechanical shutter/aperture drive unit (which is denoted by shutter/aperture drive unit in the drawing) 505 drives the mechanical shutter 503 and the aperture 504. Note that an optical filter such as an ND filter may be provided as a unit for controlling exposure amounts.

The imaging element 506 receives light from a object whose image is formed through the imaging optical system, then performs photoelectric conversion thereon, and outputs an electric signal. The imaging signal processing circuit 507 processes the output signal of the imaging element 506 and outputs a processed image signal. The first memory unit (which is denoted by a memory unit I in the drawing) 508 stores the image signal processed by the imaging signal processing circuit 507, and the like.

The overall control arithmetic operation unit 509 is a core unit in charge of overall control of the imaging system and includes a central processing unit (the CPU). The CPU controls operations of respective units by executing programs read from a second memory unit (which is denoted by memory unit II in the drawing) 514. The second memory unit 514 stores arithmetic operation results of the CPU, camera information and the like set in the imaging apparatus through user operations. A recording medium control interface (I/F) unit 510 records an image signal and the like in a recording medium 512 complying with control commands of the overall control arithmetic operation unit 509 and performs a reading process on information from the recording medium 512. The recording medium 512 can be detached from the main body of the imaging apparatus. A display unit 511 includes a display device such as a liquid crystal display panel and displays image data and the like on a screen complying with a control command of the overall control arithmetic operation unit 509. An external interface (I/F) unit 513 is a communication processing unit that exchanges information with an external device such as a computer. An operation unit 515 includes an input device such as a switch, a touch panel, and the like, receives an operation instruction of a user, and outputs an operation instruction signal to the overall control arithmetic operation unit 509. In addition, the overall control arithmetic operation unit 509 controls the imaging element 506 by outputting a control signal for controlling each of the constituent elements of the imaging element 506 shown in FIG. 1 thereto. The control signal includes an imaging synchronization signal, a drive mode setting, exposure setting information, or the like.

Light from an object that has passed through the lens unit 501 is adjusted to have an appropriate light amount by the aperture 504 and forms an image on an imaging plane of the imaging element 506. Photoelectric conversion units forming the pixel unit 101 of the imaging element 506 perform photoelectric conversion to an optical image of an object and output electric signals. The electric signals are then object to gain control, converted from analog signals to digital signals through A/D conversion, then taken as signals of R, Gr, Gb, and B, and then sent to the imaging signal processing circuit 507. The imaging signal processing circuit 507 performs various kinds of signal processing such as a low-pass filtering process of reducing noise, a shading correction process, or a white balance process and then further performs various kinds of correction, compression of image signals, or the like.

The lens drive unit 502 controls the lens unit 501 during imaging for zoom drive, focus drive, and the like. The mechanical shutter 503 and the aperture 504 are each driven by the mechanical shutter/aperture drive unit 505 complying with a control command of the overall control arithmetic operation unit 509. The first memory unit 508 temporarily stores an image signal after the imaging. The recording medium control I/F unit 510 performs a process of recording the image signal in the recording medium 512. The display unit 511 displays a captured image on the screen.

Figure 8:
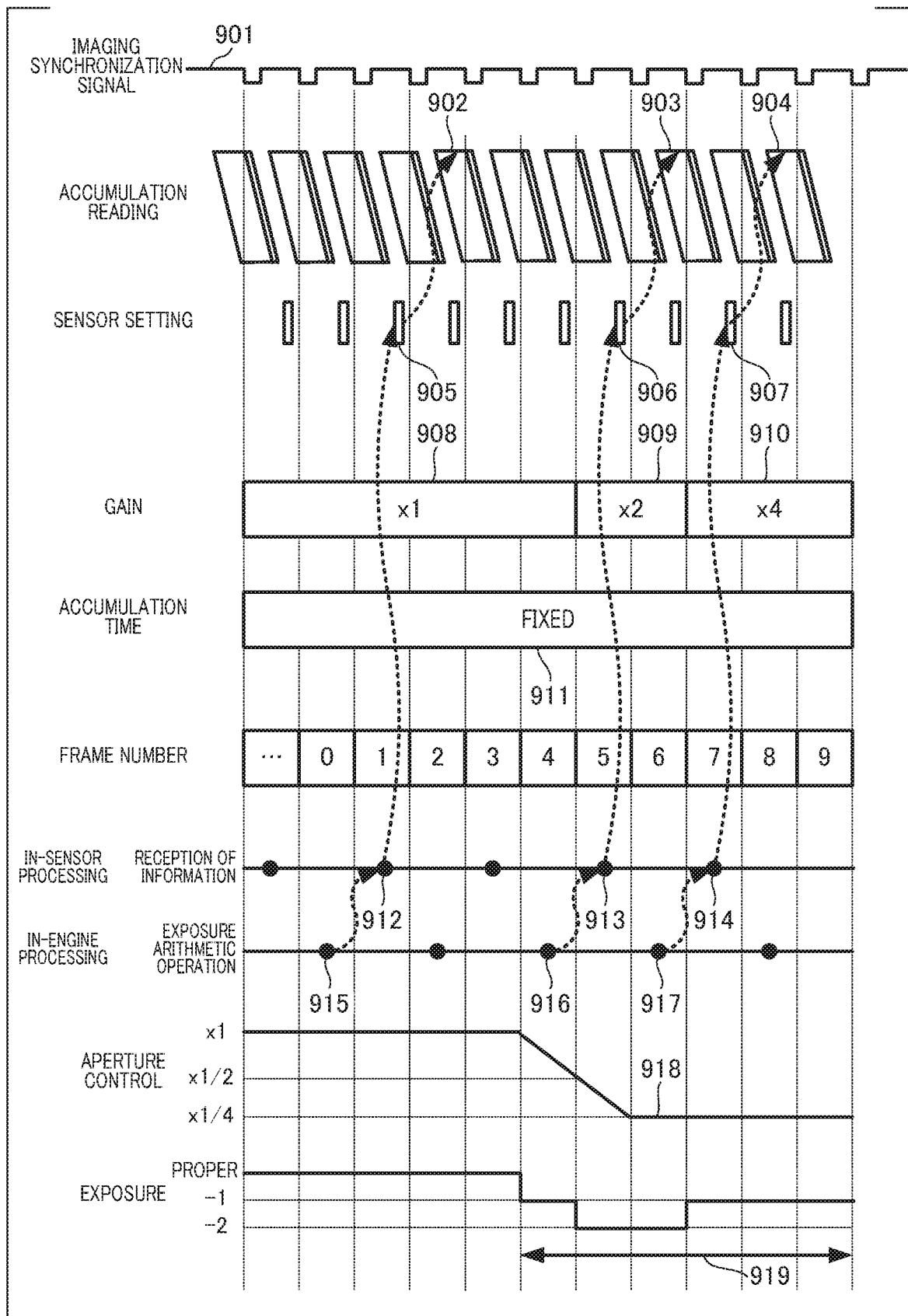
FIG. 8 is a timing chart illustrating a process of a comparative example.

Here, occurrence of flickering caused by aperture drive and exposure control will be described with reference to a comparative example of FIG. 8. FIG. 8 is a timing chart showing an exposure control mechanism of the comparative example. An imaging synchronization signal 901 is used to control a timing for the imaging element 506 to set accumulation, reading, and the like and a timing for the imaging signal processing circuit 507 to take in image information transferred from the imaging element 506. Timings 902, 903, and 904 of the imaging element 506 for accumulation and reading are exemplified, and timings 905, 906, and 907 for setting the operations are denoted by a sensor setting.

Gain indicates gain set for each frame in the imaging element 506. A gain control signal of the in-element arithmetic operation unit 118 performs a gain setting for the gain amplifier 110. Gain 908 is "×1," gain 909 is "×2," and gain 910 is "×4." ×2 indicates gain one step higher than ×1. An accumulation time 911 is set for each frame by the imaging element 506, and the accumulation time is "fixed" here. The lower side of the item indicates frame numbers. In in-element processing, timings 912, 913, and 914 at which information is received from the overall control arithmetic operation unit 509 are indicated for processes performed within the imaging element 506. In in-engine processing, timings 915, 916, and 917 of exposure arithmetic processing are indicated for processes performed within the overall control arithmetic operation unit 509. Here, it is assumed that the overall control arithmetic operation unit 509 performs the exposure arithmetic processing once for every two frames, and the imaging element 506 is indicated to receive an arithmetic result in the next frame. With regard to aperture control, an aperture control change 918 of a lens device mounted in the imaging apparatus is indicated by a graph line. The graph shows that the aperture is driven to have one level for each frame and narrows its aperture two levels through two frames. With regard to exposure, changes of exposure states are exemplified such that "proper" indicates a proper exposure state, "−1" indicates an underexposure state of one level, and "−2" indicates an underexposure state of two levels. A period 919 indicates a period in which an exposure state changes from "proper" to "−1," then further to "−2," and then goes back to "−1."

Next, a flow of control will be described. The overall control arithmetic operation unit 509 decides a target luminance value based on an exposure setting, a program mode, a photometry mode, a state of the object, or the like, and holds the value in the second memory unit 514. In addition, a luminance value of the object is calculated based on image information read from the imaging element 506 just before. The overall control arithmetic operation unit 509 performs an exposure arithmetic operation at the timing 915, decides the accumulation time 911 and the gain 908 to be set, and then transfers setting data to the imaging element 506. The imaging element 506 sets information received at the timing 912, which is one frame later, at the timing 905 of the sensor setting. Accordingly, the setting is reflected in the accumulation time and reading (902) of the next frame. Read image information is transferred to the imaging signal processing circuit 507 as image information of the frame number 3. As described above, a delay time which corresponds to at least several frames occurs in the period from the exposure arithmetic operation to the reading of the image information. In the aperture control, the overall control arithmetic operation unit 509 performs an exposure arithmetic operation using image information after exposure is changed due to the control. Since the imaging element 506 is set in order to follow a change of the aperture control, it takes time to stabilize an exposure state after the following operation. In a case in which the aperture 504 considerably moves in a short period of time like a case of a still image photographing lens, for example, if an exposure state abruptly changes in the period 919 of FIG. 8, there is a possibility of flickering occurring on an image. In particular, a load of arithmetic operation processing performed by the overall control arithmetic operation unit 509 increases while the number of pixels to be read increases, and a time lag occurs before an exposure arithmetic result is reflected in control of the imaging element. Furthermore, in a case in which a frame rate also increases, even if arithmetic processing is performed within the same period of time, the number of delayed frames increases when the processes are performed in units of frames. Thus, when a moving image acquired at a high frame rate is slowly reproduced or the like, periods in which following exposure is not sufficiently fulfilled remarkably increase.

Figure 5:
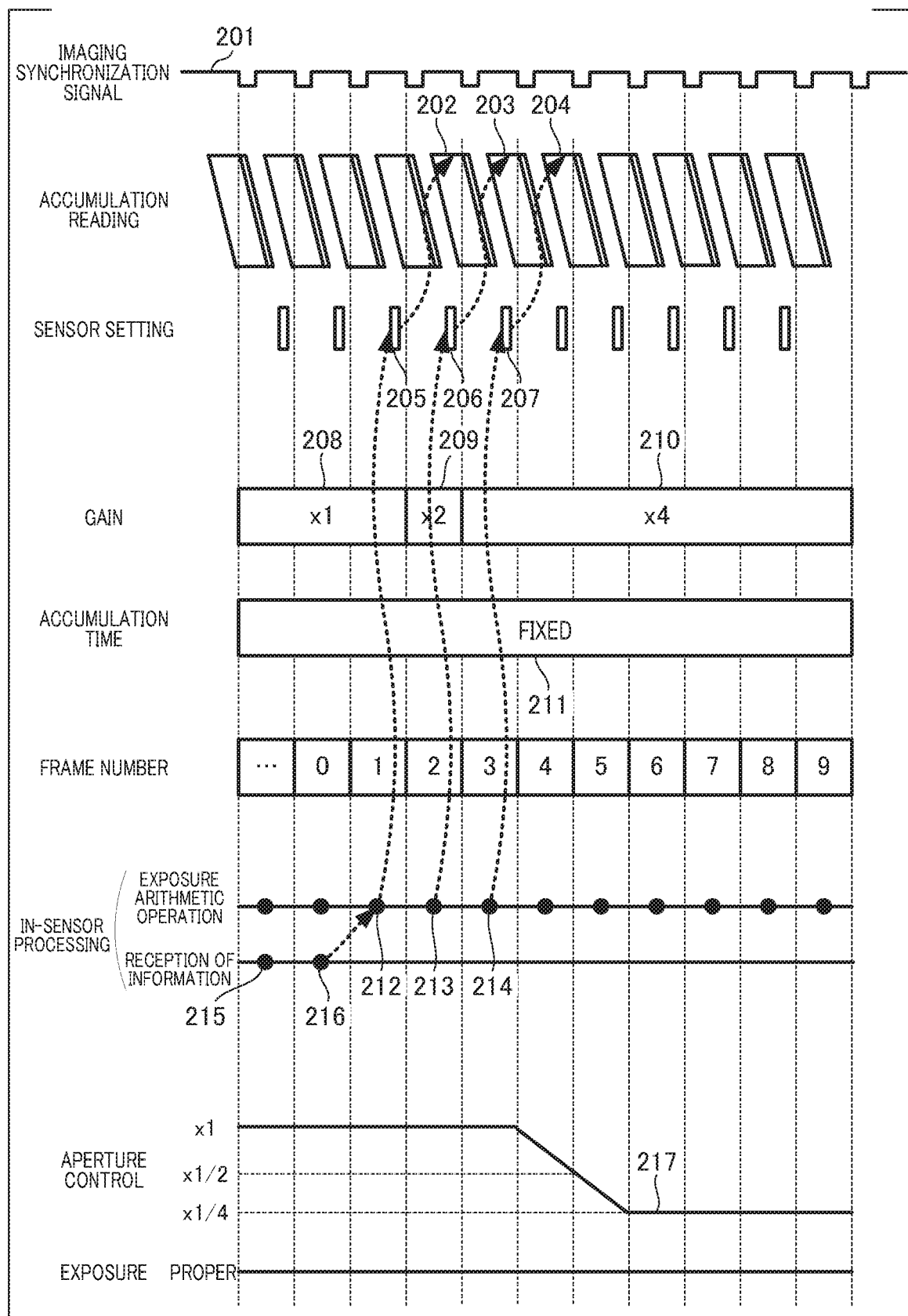
FIG. 5 is a timing chart illustrating a process of a first embodiment of the present invention.
Figure 6:
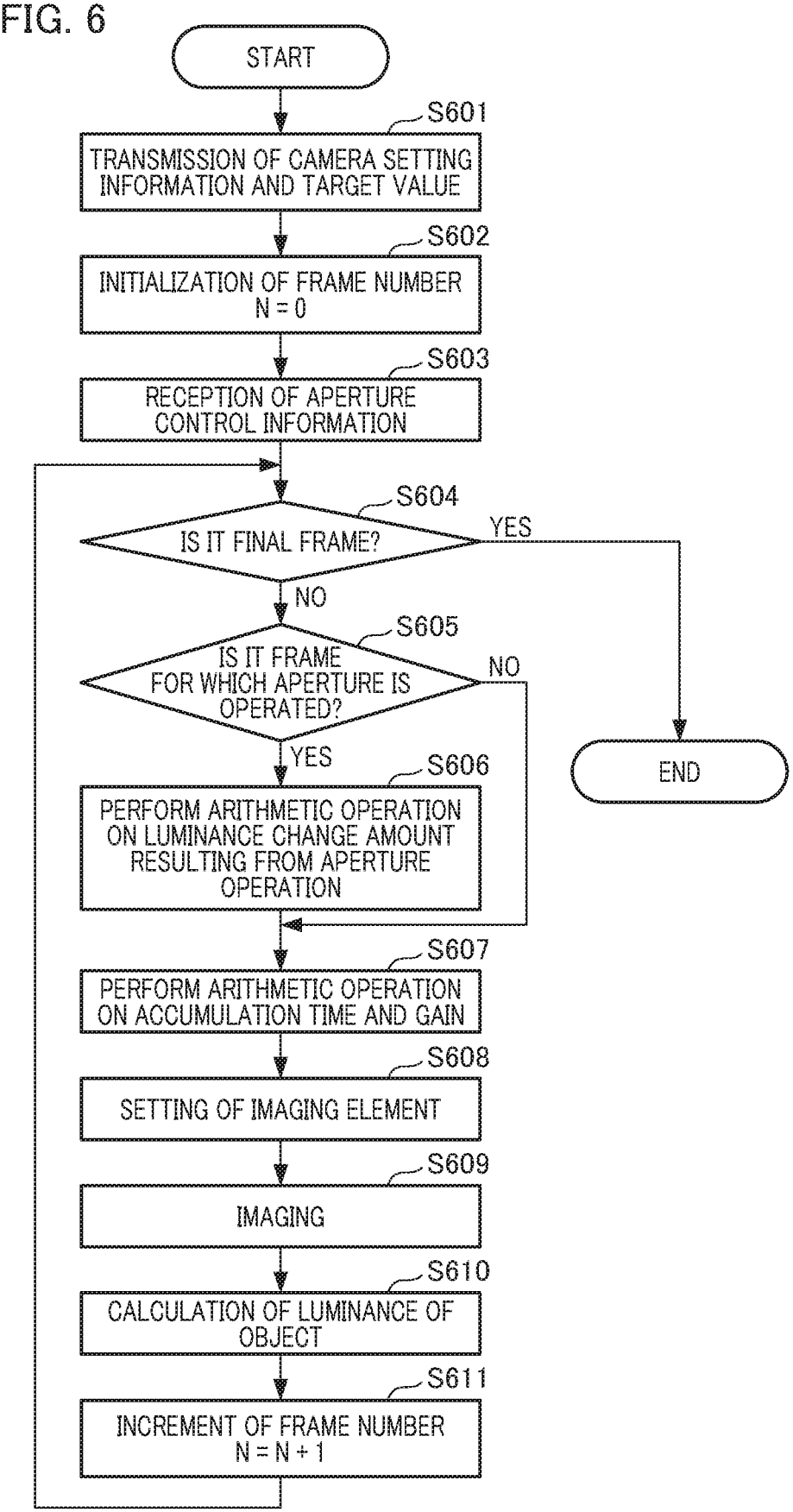
FIG. 6 is a flowchart according to the first embodiment of the present invention.

Control of minimizing a change of exposure using the aperture control according to the present embodiment will be described with reference to FIG. 5 and FIG. 6. FIG. 5 is a timing chart for showing an exposure control mechanism according to the present embodiment. FIG. 6 is a flowchart for describing a process of the imaging system according to the present embodiment.

FIG. 5 shows an imaging synchronization signal 201 for the imaging element 506, accumulation and reading timings 202 to 204, setting timings 205 to 207, and gain control timings 208 to 210. Furthermore, although an accumulation time setting 211, frame numbers, and a aperture control change 217 are shown, they are similar to those of FIG. 8, and thus detailed description thereof will be omitted. A difference from FIG. 8 is in-element processing executed within the imaging element. In the in-element processing, exposure arithmetic operation timings 212, 213, and 214 and information reception timings 215 and 216 are indicated. In the in-element processing, an exposure arithmetic operation is performed for each frame. That is, the in-element processing is not affected by a load rate of a CPU like the overall control arithmetic operation unit 509, a memory bandwidth, or the like resulting from execution of other processes. The imaging element 506 receives camera setting information of the imaging system and a target luminance value from the overall control arithmetic operation unit 509 at the timing 215. Then, the imaging element 506 receives aperture control information to be used by the mechanical shutter/aperture drive unit 505 from the overall control arithmetic operation unit 509 at the timing 216.

When the imaging system is activated in FIG. 6, the overall control arithmetic operation unit 509 transmits camera setting information and a target luminance value of the imaging system to the imaging element 506 in S601. The camera setting information includes, for example, exposure setting information, mode information such as a drive mode, a program mode, or a photometry mode, object information, and the like. A reception timing of the imaging element 506 is indicated by the timing 215 of FIG. 5. Although the camera setting information and the target luminance value are assumed to be transmitted to the imaging element 506 each time there is a change of the setting of the imaging system made by a user operation, the information may be transmitted at fixed intervals.

The overall control arithmetic operation unit 509 initializes frame number (which will be denoted by N) in S602. The value of the frame number N is initialized to zero in the example of FIG. 5. The frame number N is information used to synchronize the overall control arithmetic operation unit 509 with the imaging element 506. The initialization timing can be set not only once when the imaging system is activated, but also multiple times whenever there are changes in the camera setting information or the target luminance value.

A transfer process of aperture control information is performed in S603. The aperture control information is information indicating in how many stages the aperture should be controlled for what frame section. When the aperture 504 is controlled, the overall control arithmetic operation unit 509 transfers the aperture control information used by the lens drive unit 502 to the imaging element 506. A reception timing of the imaging element 506 is indicated by the timing 216 of FIG. 5. In the example of FIG. 5, as the aperture control information, control information (217) by which the aperture is narrowed by one stage from a current aperture value in each of the frame numbers N=4 and N=5 is transferred to the imaging element 506. Note that, instead of designating a frame number in the aperture control information, a method of using aperture control information in which a relative time from a predetermined reference timing is designated may be used. In this case, a process of converting relative time information into a frame number is performed in the imaging element. In addition, information related to timings may not be included in the aperture control information. In this case, control may be started with a time limit and a predetermined delay (after a frame or the like).

S604 is a determination process to determine whether a frame is the final frame, and the overall control arithmetic operation unit 509 determines whether the imaging process is to be finished. The imaging process is finished when power of the imaging system is turned off explicitly by a user using the operation unit 515, when photographing is stopped, when a temporary stop process is performed through a menu operation, or the like. When a frame is determined to be the final frame, the process ends, and when the frame is determined not to be the final frame, the process proceeds to the process of S605. The following processes of Steps S605 to S610 are performed under control of the imaging element 506. In cases other than the case in which there is a change of the camera setting information or the target luminance value, the camera setting information is not transferred from the overall control arithmetic operation unit 509 to the imaging element 506 for each frame. Accordingly, an amount of communication between the overall control arithmetic operation unit 509 and the imaging element 506 can be reduced.

The imaging element 506 determines whether it is a timing at which a aperture operation is to be performed on a current frame based on the aperture control information received from the overall control arithmetic operation unit 509 in S605. In a case in which it is determined to be the timing of the aperture operation, the process proceeds to the process of S606, and in a case in which it is determined not to be the timing, the process transitions to S607.

The in-element arithmetic operation unit 118 of the imaging element 506 obtains a luminance change amount resulting from the aperture operation based on the aperture control information in S606. The in-element arithmetic operation unit 118 performs an arithmetic operation for exposure in accordance with the luminance change amount to decide an accumulation time and gain in S607 (see the timing 212 of FIG. 5). In a case in which the luminance change amount is zero, the setting of the previous frame is continued. In S608, the accumulation time and gain obtained in S607 are set for the section of the frame number 1 (see the timing 205 of FIG. 5). The in-element arithmetic operation unit 118 causes the exposure control unit 120 to perform exposure control by setting the accumulation time of the pixel unit 101, and sets a gain value of the gain amplifiers 110 using a gain control signal Sg. The gain amplifiers 110 constituting the gain unit are variable gain amplifiers for which a gain value can be set. An imaging operation of the imaging element 506 is performed in S609. For example, an accumulation process and a reading process are sequentially executed for each of lines in the section of frame numbers 2 to 3, and image information is transferred to the frame memory 117 at the frame number 3 (see the timing 202 of FIG. 5).

The in-element arithmetic operation unit 118 of the imaging element 506 calculates a luminance value of the object using the image information of the frame memory 117 in S610, causes the calculation result to be stored in the second memory unit 514, and transfers the image information to an image processing unit outside the imaging element. In S611, the overall control arithmetic operation unit 509 executes an increment process on frame number N. 1 is added to the value of the frame number N, the process returns to S604 for continuation, and the processes to the end of the imaging operation are repeated. Note that the relations of the timings 213, 206, and 203, and the timings 214, 207, and 204 of FIG. 5 are similar to the relation of the timings 212, 205, and 202. Although the aperture operation of two stages is performed as indicated by the aperture control change 217 of FIG. 5, an exposure state thereof is maintained in a proper exposure state at all times, unlike the exposure state of FIG. 8.

In a drive mode in which a moving image with a high frame rate (HRF) or the like is processed with strict time application, there is concern of exposure arithmetic processing not being performed within a time set between frames, in addition to an increase in a load or a memory bandwidth of a CPU. In such a case, the overall control arithmetic operation unit 509 can perform exposure control for each frame according to the present embodiment. In addition, by transferring aperture control information from the overall control arithmetic operation unit 509 to the imaging element 506, the imaging element 506 can ascertain a timing of aperture control in advance. Thus, flickering in an image that may be caused by an aperture operation can be minimized by the imaging element 506 performing exposure control in accordance with the aperture operation. In addition, in the lens-interchangeable imaging system, exposure control can be performed in accordance with characteristics of the aperture of the lens device mounted in the camera main body.

In the present embodiment, the processing example in which the imaging element 506 receives the aperture control information from the overall control arithmetic operation unit 509 and reflects the information in setting for the next frame has been described. The invention is not limited thereto, and the aperture control information to be transmitted to the imaging element 506 may include an exposure following speed. The exposure following speed is information for deciding a speed at which an exposure arithmetic operation should be followed from when aperture control information is received. In this case, the exposure following speed can be adjusted by reflecting aperture control information in the exposure arithmetic operation at, for example, the timing 213 or 214, rather than the timing 212 of FIG. 5, in accordance with the exposure following speed received by the imaging element 506. In addition, in the present embodiment, a new target luminance value can be set even during aperture control, and the in-element arithmetic operation unit 118 performs an exposure arithmetic operation based on the received new target luminance value. The invention is not limited thereto, and the imaging element 506 may receive no new target luminance value during aperture control. That is, the in-element arithmetic operation unit 118 receives no new target luminance value while the imaging unit performs an exposure arithmetic operation and control. According to the present embodiment, a processing load imposed on the arithmetic processing unit of the imaging apparatus to perform exposure control can be reduced, and a change of exposure resulting from aperture control which can be a cause of flickering in an image can be minimized. Note that the operations shown in FIG. 5 and FIG. 8 can be appropriately switched in accordance with control of the drive mode by the overall control arithmetic operation unit 509. Note that predetermined information in addition to camera setting information and a target luminance value may be set for the imaging element 506. For example, exposure control can be appropriately performed by setting a followable range (maximum gain, a minimum shutter speed, or the like), or the like.

Second Embodiment

Next, a second embodiment of the present invention will be described. Although the configuration in which the imaging element 506 has the function of an exposure arithmetic operation has been described in the first embodiment, a process of switching the function of an exposure arithmetic operation by the arithmetic processing unit of the imaging system and the function of an exposure arithmetic operation of the imaging element 506 will be described in the present embodiment. Note that similar matters to those of the first embodiment will not be described, and differences will be mainly described. This way of omission of description also applies to the embodiments which will be described below.

Figure 7:
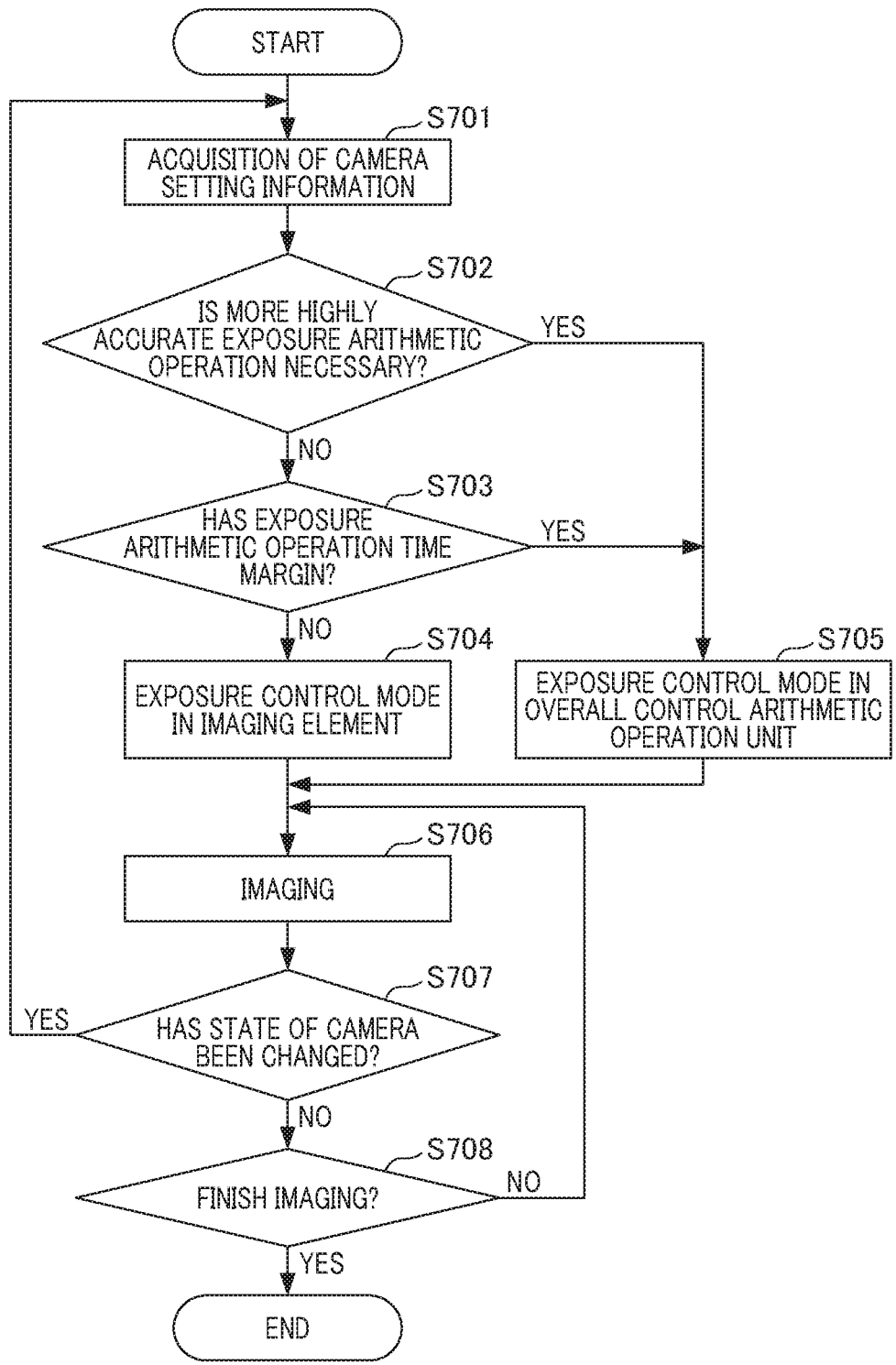
FIG. 7 is a flowchart according to a second embodiment of the present invention.

A process of the imaging system according to the present embodiment will be described with reference to the flowchart of FIG. 7. When the imaging system is activated, the overall control arithmetic operation unit 509 acquires camera setting information held by the imaging system in S701. The camera setting information includes a drive mode for still images/moving images (4K/Full HD/HD/HFR), an exposure setting, a program mode, a photometry mode, object information, and the like. In addition, load information of the CPU in accordance with various setting combinations is held in the second memory unit 514, and the load information is acquired.

The overall control arithmetic operation unit 509 determines whether a more highly accurate exposure arithmetic operation is necessary in S702. For example, a case in which some photometry arithmetic operations in the imaging element 506 are necessary in accordance with setting information of the photometry mode, or information of the face or a specific organ (the eyes, or the like) of a object is assumed. In this case, there is a possibility that it will be hard to perform the exposure arithmetic processing with only the imaging element 506 or that it will not be possible to perform the process with necessary accuracy. When it is determined that a more highly accurate exposure arithmetic operation is necessary, the overall control arithmetic operation unit 509 performs the process of S705, and when it is determined that a more highly accurate exposure arithmetic operation is unnecessary, the process proceeds to the process of S703.

The overall control arithmetic operation unit 509 determines whether an exposure arithmetic operation time has a margin in S703. The process of determining a temporal margin is performed based on a processing load amount per unit time, and specifically, the number of pixels included in a frame and the number of image processing operations performed with each signal are determined. The overall control arithmetic operation unit 509 determines a processing load amount of the next frame, for example, based on a setting parameter (the drive mode or content of data processing). The content of data processing includes a purpose of processing such as whether data is to be output for display or for display and recording. Whether a state is a state in which the exposure arithmetic processing can be executed for each frame is determined based on the acquired drive mode, load information of the CPU, or the like. As an example in which the arithmetic processing has no margin, for example, a case in which the overall control arithmetic operation unit 509 detects the object and arithmetic processing with a load amount in which the process is not likely to be completed within a unit time using a result of the detection is necessary is exemplified. When it is determined that the exposure arithmetic processing can be executed for each frame in S703, the process transitions to S705. On the other hand, when the processing situation is unfavorable and it is determined that the exposure arithmetic processing is not executed for each frame, the process proceeds the process of S704.

The overall control arithmetic operation unit 509 sets an exposure control mode for the imaging element 506 and notifies the imaging element 506 of camera setting information in S704. On the other hand, the overall control arithmetic operation unit 509 sets an exposure control mode for the overall control arithmetic operation unit 509 in S705. In the mode, an exposure time and gain setting information are transmitted from the overall control arithmetic operation unit 509 to the imaging element 506. After the process of S704 or S705, the process proceeds to the process of S706. The overall control arithmetic operation unit 509 starts an imaging operation in the exposure control mode set in S704 or S705 and repeats the process for each frame in S706.

The overall control arithmetic operation unit 509 determines whether a state of the imaging system (the lens unit and the camera main body) has been changed in S707. When it is determined that the state of the imaging system has been changed, the process returns to S701 to acquire camera setting information again, and the process continues. In addition, when it is determined that the state of the imaging system has not been changed in S707, the process proceeds to the process of S708. The overall control arithmetic operation unit 509 determines whether the imaging process should be finished in S708. When it is determined that the imaging process should be finished, the series of processes ends. In a case in which the imaging process is continued, the process returns to the process of S706 to repeat the imaging process.

In the present embodiment, the camera setting information is acquired and the two kinds of exposure control are appropriately switched in accordance with the drive mode and a state of a load of the CPU. For example, in a case in which a processing load amount of the overall control arithmetic operation unit 509 is greater than or equal to a threshold value, the mode is switched to the first exposure control performed by the imaging element, and in a case in which the processing load amount is less than the threshold value, the mode is switched to the second exposure control performed by the overall control arithmetic operation unit 509. More highly accurate exposure control can be performed by switching to the second exposure control if necessary. In addition, a processing load of the overall control arithmetic operation unit 509 can be reduced by switching to the first exposure control when the processing load amount is great. Note that the two exposure control modes are mere examples, and the invention is not limited to the configuration in which the first and second exposure control modes are switched. A configuration in which the two exposure control modes are used in combination is also possible in order to realize a process of a more complicated function. For example, a process in which the first exposure control mode based on an arithmetic operation performed by the imaging element and the second exposure control mode performed by the overall control arithmetic operation unit 509 are used in combination is executed in S705 of FIG. 7. Alternatively, control in which the first and second exposure control modes are used in combination is executed as a third exposure control mode using a determination result under an additional determination condition. Note that the overall control arithmetic operation unit 509 may have a configuration in which the unit can acquire predetermined information from the imaging element 506. For example, an arithmetic operation result obtained by the in-element arithmetic operation unit 118 or gain or a set value of an electronic shutter speed may also be acquired. Furthermore, information indicating a state in which the imaging element 506 has reached an exposure limit that the imaging element can follow or the like may also be acquired.

Third Embodiment

Next, a third embodiment of the present invention will be described. In the first embodiment, the example in which gain multiplication processes are uniformly performed within a screen in the configuration of the imaging element 506 with the function of an exposure arithmetic operation has been described. In the present embodiment, multiplication processes are performed using different gain values in a region within a photographing screen. Specifically, an example in which the in-element arithmetic operation unit 118 controls the gain amplifier 110 and different gain values are applied in the vertical direction of a screen will be described.

Exposure control according to the present embodiment will be described with reference to FIG. 5. Since slit rolling reading is performed in moving image capturing, accumulation timings are different in upper and lower portions of a photographing screen. In FIG. 5, a gain setting of frame number 4 at which the aperture starts changing is performed at a timing 209 which corresponds to a sensor setting of frame number 2. An example in which a gain value is uniformly set to "×2" on the screen is shown. In the present embodiment, in order to change a gain value in upper and lower parts of the screen, the imaging element 506 changes the gain setting for each of horizontal lines. Since the gain value changes between "×1" and "×2" in the example of FIG. 5, "×1" is set for the uppermost line of the screen, and "×2" is set for the lowermost line of the screen. A gain value between "×1" and "×2," for example, a gain value that is greater than one time a default value and smaller than two times the default value is set for a line positioned between the uppermost line and the lowermost line such that the gain value is evenly distributed on the like. Similarly, in a gain setting for the next frame, a gain value between "×2" and "×3," for example, a gain value that is greater than or equal to two times the default value and equal to or smaller than three times the default value is set for the lines from the uppermost line to the lowermost line such that the value is evenly distributed thereon. Further, in a gain setting for the next frame, a gain value between "×3" and "×4" is set for the lines from the uppermost line to the lowermost line such that the value is evenly distributed thereon.

In the present embodiment, it is possible to avoid uneven exposure states in the vertical direction of the screen with respect to frame images accumulated during a aperture operation. Although the exemplary embodiments of the present invention have been described above, the present invention is not limited thereto and can be variously modified and changed within the scope of the gist of the invention.

Fourth Embodiment

Next, a fourth embodiment of the present invention will be described. The process in which the function of an exposure arithmetic operation of the arithmetic processing unit of the imaging system and the function of an exposure arithmetic operation of the imaging element 506 are switched has been described in the second embodiment. On the other hand, in the present embodiment, a process in which the function of an exposure arithmetic operation of the arithmetic processing unit of the imaging system and the function of an exposure arithmetic operation of the imaging element 506 are used in combination will be described.

A process of the imaging system according to the present embodiment will be described with reference to the flowchart of FIG. 9. When the imaging system is activated, the overall control arithmetic operation unit 509 acquires camera setting information held by the imaging system in S1101. Note that the camera setting information includes a drive mode for still images/moving images (4K/Full HD/HD/HFR), an exposure setting, a program mode, a photometry mode, object information, and the like.

The overall control arithmetic operation unit 509 determines whether a more highly accurate exposure arithmetic operation is necessary in S1102. For example, a case in which some photometry arithmetic operations in the imaging element 506 are necessary in accordance with setting information of the photometry mode, or information of the face or a specific organ (the eyes, or the like) of the object is assumed. In this case, there is a possibility that it is hard to perform the exposure arithmetic processing by only the imaging element 506 or that it is not possible to perform the process with necessary accuracy. When it is determined that a more highly accurate exposure arithmetic operation is necessary, the overall control arithmetic operation unit 509 performs the process of S1104 so that the process transitions to an exposure control mode in which the overall control arithmetic operation unit 509 and the imaging element 506 are used in combination. In addition, when it is determined that a more highly accurate exposure arithmetic operation is unnecessary, the process proceeds to the process of S1103 so that the process transitions to an exposure control mode of the imaging element 506. The overall control arithmetic operation unit 509 notifies the imaging element 506 of the camera setting information in S1103 and S1104. An example of the more highly accurate exposure arithmetic processing includes, for example, a case in which the overall control arithmetic operation unit 509 detects the object and performs arithmetic processing using a result of the detection.

The overall control arithmetic operation unit 509 starts an imaging operation in the exposure control mode set in S1103 or S1104 and repeats the process for each frame in S1105. The overall control arithmetic operation unit 509 determines whether a state of the imaging system (the lens unit and the camera main body) has been changed in S1106. When it is determined that the state of the imaging system has been changed, the process returns to S1101 to acquire camera setting information again, and the process continues. In addition, when it is determined that the state of the imaging system has not been changed in S1106, the process proceeds to the process of S1107. The overall control arithmetic operation unit 509 determines whether the imaging process should be finished in S1107. When it is determined that the imaging process should be finished, the series of processes ends. In a case in which the imaging process is continued, the process returns to the process of S1105 to repeat the imaging process.

Figure 10:
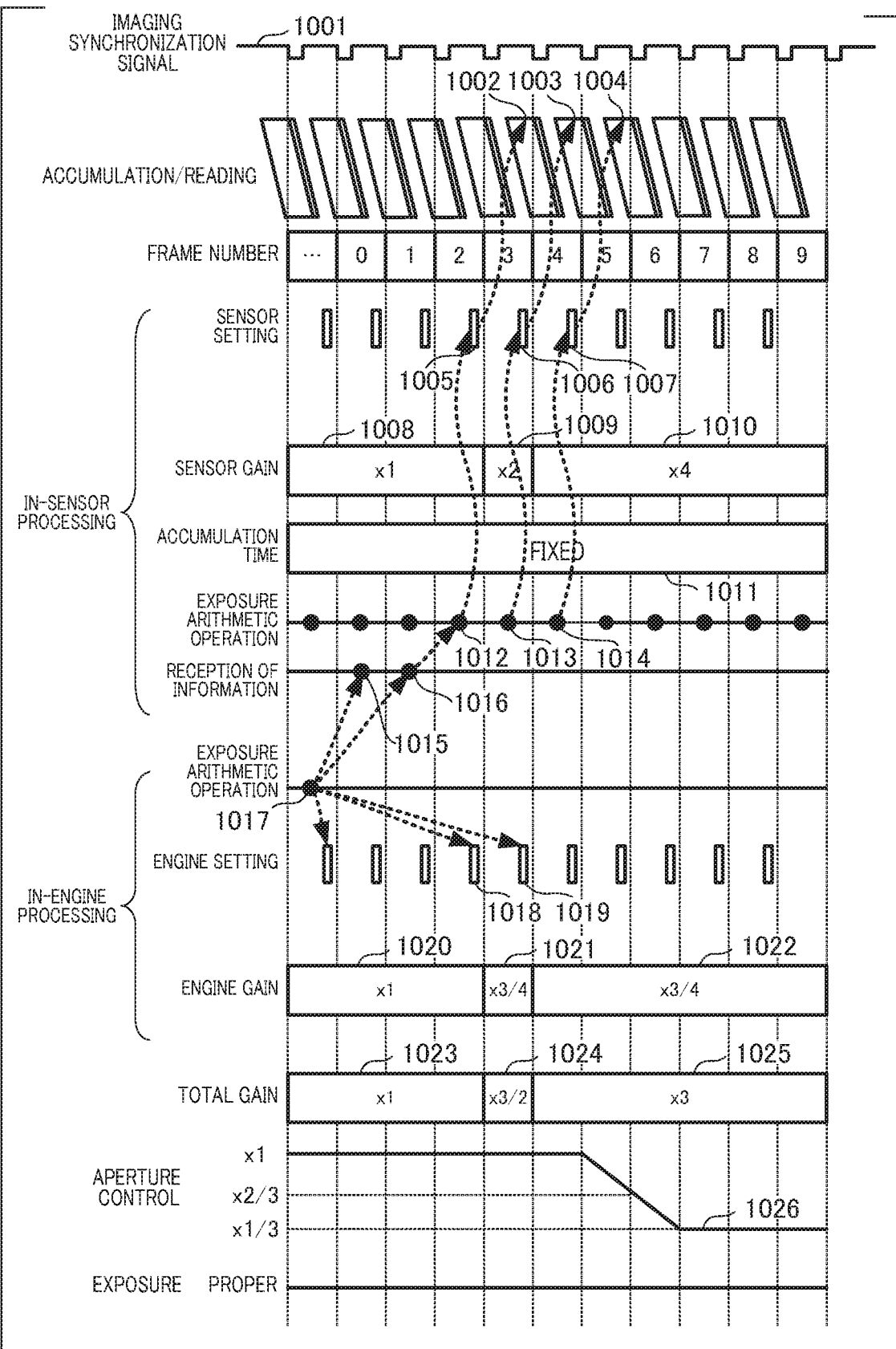
FIG. 10 is a timing chart illustrating a process of the fourth embodiment of the present invention.
Figure 11:
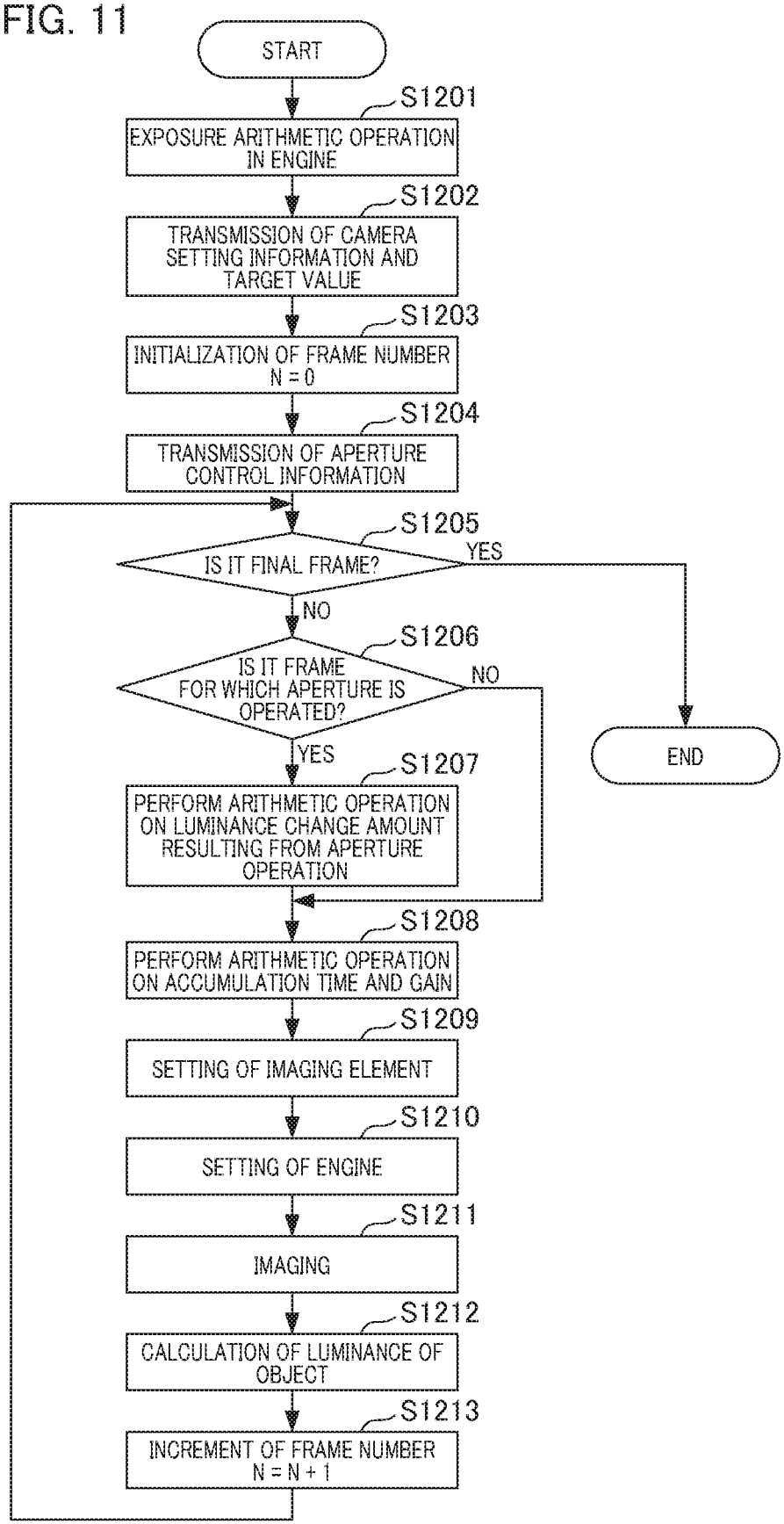
FIG. 11 is a flowchart illustrating a process of an imaging system.

An imaging process in which the function of an exposure arithmetic operation of the arithmetic processing unit of the imaging system and the function of an exposure arithmetic operation of the imaging element 506 are used in combination will be described with reference to FIG. 10 and FIG. 11 in the present embodiment. FIG. 10 is a timing chart showing an exposure control mechanism according to the present embodiment. FIG. 11 is a flowchart for describing a process of the imaging system according to the present embodiment.

FIG. 10 shows an imaging synchronization signal 1001 for the imaging element 506, accumulation and reading timings 1002 to 1004, setting timings 1005 to 1007, and gain control timings 1008 to 1010. Furthermore, an accumulation time setting 1011, frame numbers, and a change 1026 of aperture control are shown. Although exposure arithmetic timings 1012, 1013, and 1014, and information reception timings 1015 and 1016 are shown in an in-element processing, they are similar to those of FIG. 5, and thus detailed description thereof will be omitted. A difference from FIG. 5 is an in-engine processing executed by the overall control arithmetic operation unit 509. In the in-engine processing, an exposure arithmetic operation timing 1017, setting timings 1018 and 1019, and gain control timings 1020 to 1022 are shown. Furthermore, total gains 1023 to 1025 that are decided through multiplication of a sensor gain and an engine gain are shown. A setting value of engine gain of photographing starting from frame number 0 is decided using the exposure arithmetic operation timing 1017 of the engine. In addition, camera setting information, a target luminance value, and aperture control information are transmitted to the imaging element 506 at the same time. While arithmetic processing is performed for each frame in the in-element processing, arithmetic processing is performed at the first timing or intermittent timings in the in-engine processing, and thus influence of a load ratio, a memory bandwidth, or the like of the CPU can be reduced.

Figure 9:
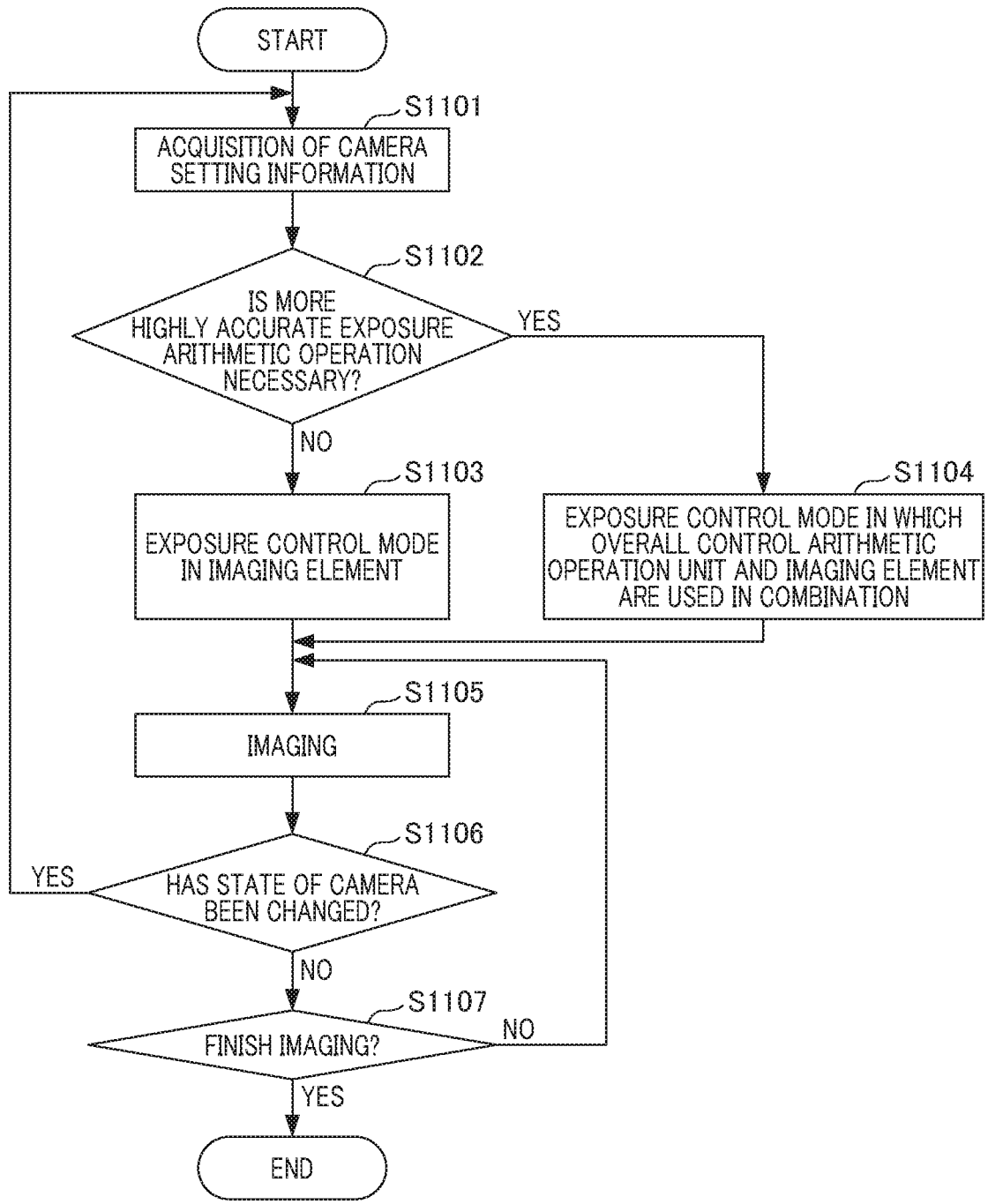
FIG. 9 is a flowchart according to a fourth embodiment of the present invention.

In FIG. 11, when the imaging system is activated, the overall control arithmetic operation unit 509 recognizes camera setting information of the imaging system acquired in S1101 of FIG. 9 and performs an exposure arithmetic operation in the engine in S1201. For example, one piece of the camera setting information is a program diagram. The overall control arithmetic operation unit 509 divides a control range into a control range of the imaging element 509 and a control range of the inside of the engine. The control range of the imaging element 509 handles gain values of integral multiples such as 1008 to 1010 to simplify an arithmetic operation amount, and a circuit scale inside the imaging element 509 can be reduced. On the other hand, since the engine includes circuits that can perform more complicated arithmetic operations, the control range of the inside of the engine handles gain values with decimal points that are difficult for the imaging element 509 to perform arithmetic operations. As an example, the imaging element 509 and the engine can share their roles.

The overall control arithmetic operation unit 509 transmits the camera setting information and the target luminance value related to the imaging system to the imaging element 506 in S1202. In the present embodiment, the camera setting information is assumed to include a program diagram. The camera setting information may have a configuration of including exposure setting information, mode information such as a drive mode, a program mode, and a photometry mode, object information, and the like. A reception timing of the imaging element 506 is indicated by the timing 1015 of FIG. 10. Although the camera setting information and the target luminance value are assumed to be transmitted to the imaging element 506 each time a setting of the imaging system is changed through a user operation, the information may be transmitted at fixed intervals.

The overall control arithmetic operation unit 509 initializes a frame number (which will be denoted by N in the present embodiment) in S1203. The value of the frame number N is initialized to zero in the present embodiment. Note that the frame number N is information to be used to synchronize the overall control arithmetic operation unit 509 with the imaging element 506. The initialization timing can be set not only once when the imaging system is activated, but also multiple times whenever there are changes in the camera setting information or the target luminance value.

A transfer process of aperture control information is performed in S1204. The aperture control information is information indicating in how many stages the aperture should be controlled for what frame section. When the aperture 504 is controlled, the overall control arithmetic operation unit 509 transfers the aperture control information used by the lens drive unit 502 to the imaging element 506. A reception timing of the imaging element 506 is indicated by the timing 1016 of FIG. 10. As the aperture control information in the present embodiment, control information (the change 1026) by which the aperture is narrowed by one stage from a current aperture value in each of the frame numbers N=4 and N=5 is transferred to the imaging element 506. Note that, instead of designating a frame number in the aperture control information, a method of using the aperture control information in which a relative time from a predetermined reference timing is designated may be used. In this case, a process of converting relative time information into a frame number is performed in the imaging element. In addition, information related to timings may not be included in the aperture control information. In this case, control may be started with a time limit and a predetermined delay (after a frame or the like).

S1205 is a determination process to determine whether a frame is the final frame, and the overall control arithmetic operation unit 509 determines whether the imaging process is to be finished. The imaging process is finished when power of the imaging system is off explicitly by a user using the operation unit 515, when photographing is stopped, when a temporary stop process is performed through a menu operation, or the like. When a frame is determined to be the final frame, the process ends, and when the frame is determined not to be the final frame, the process proceeds to the process of S1206. The following processes of Steps S1206 to S1209, S1211, and S1212 are performed under control of the imaging element 506. In cases other than the case in which there is a change of the camera setting information or the target luminance value, the camera setting information is not transferred from the overall control arithmetic operation unit 509 to the imaging element 506 for each frame. Accordingly, an amount of communication between the overall control arithmetic operation unit 509 and the imaging element 506 can be reduced.

The imaging element 506 determines whether it is the timing at which an aperture operation is to be performed on a current frame based on the aperture control information received from the overall control arithmetic operation unit 509 in S1206. In the imaging system in which the lens unit 501 is attached to the camera main body, an aperture value varies in accordance with a change of a focal length. Thus, the aperture control information is received from the overall control arithmetic operation unit 509 in advance, and it is likewise determined whether it is the timing at which a aperture operation is to be performed for each frame. When it is determined to be the timing of the aperture operation, the process proceeds to the process of S1207, and when it is determined not to be the timing of the aperture operation, the process transitions to S1208.

The in-element arithmetic operation unit 118 of the imaging element 506 obtains a luminance change amount resulting from the aperture operation based on the aperture control information in S1207. The in-element arithmetic operation unit 118 performs an arithmetic operation for exposure in accordance with the luminance change amount to decide an accumulation time and gain in S1208 (see the timing 1012 of FIG. 10). In a case in which the luminance change amount is zero, the setting of the previous frame is continued. In S1209, the accumulation time and gain obtained in S1207 are set for the section of the frame number 1 (see the timing 1005 of FIG. 10). The in-element arithmetic operation unit 118 causes the exposure control unit 120 to perform exposure control by setting the accumulation time of the pixel unit 101, and sets a gain value of the gain amplifiers 110 using a gain control signal Sg. The gain amplifiers 110 constituting the gain unit are variable gain amplifiers for which a gain value can be set.

In S1210, while the imaging element 506 sets the accumulation time and gain, the overall control arithmetic operation unit 509 sets gain of the engine. Exposure can be finely controlled by setting gain with a decimal point in the engine. In the present embodiment, gain of "×¾" is set as engine gain 1021 and gain of "×¾" is set as engine gain 1022 as shown in FIG. 10. Total gain used in the imaging system is decided through multiplication of the imaging element 506 and the engine, and gain of "×1" is set as total gain 1023, gain of "×½" is set as total gain 1024, and gain of "×3" is set as total gain 1025.

An imaging operation of the imaging element 506 is performed in S1211. For example, an accumulation process and a reading process are sequentially performed for each of lines in the section of frame numbers 2 and 3, and image information is transferred to the frame memory 117 at the frame number 3 (the timing 1002 of FIG. 10). The in-element arithmetic operation unit 118 of the imaging element 506 calculates a luminance value of the object from the image information of the frame memory 117, causes the calculation result to be stored in the second memory unit 514, and transfers the image information to an image processing unit outside the imaging element in S1212. In S1213, the overall control arithmetic operation unit 509 executes an increment process on frame number N. 1 is added to the value of the frame number N, the process returns to S1205 for continuation, and the processes to the end of the imaging operation are repeated. Note that the relations of the timings 1013, 1006, and 1003, and the timings 1014, 1007, and 1004 of FIG. 10 are similar to the relation of the timings 1012, 1005, and 1002. Although the aperture operation of ⅓ stages is performed as indicated by the aperture control change 1026 of FIG. 10, a proper exposure state is maintained at all times.

There are cases in which gain of the imaging system is desired to be more finely controlled such as when exposure is desired to be controlled in accordance with a detection result of the object, when uneven exposure caused by flickering is desired to be controlled, or when exposure is desired to be controlled in accordance with a photometry mode. In this case, according to the present embodiment, by transmitting camera setting information to the imaging element 506 and performing exposure control using an exposure arithmetic operation of the overall control arithmetic operation unit 509 and an exposure arithmetic operation of the imaging element 506 in combination, exposure control can be performed more accurately while an increase of a processing load rate and a memory bandwidth of the CPU is minimized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-022782, filed Feb. 10, 2017 and No. 2017-227175, filed Nov. 27, 2017 which are hereby incorporated by reference wherein in their entirety.

What is claimed is:

1. An image sensor comprising:
an imaging unit which has a plurality of pixel units;
a gain circuit that sets gain with respect to an output signal of the imaging unit;
a control circuit that controls an accumulation time of the imaging unit;
a receiving interface that receives a target luminance value, external exposure control information, and information of an exposure following speed; and
an arithmetic operation circuit that detects a luminance value using the output signal of the imaging unit, calculates the gain or the accumulation time based on the luminance value, the target luminance value, and the external exposure control information, and causes the gain circuit or the control circuit to perform exposure control of the imaging unit,
wherein the arithmetic operation circuit decides a timing at which the gain or the accumulation time is calculated according to the information of the exposure following speed.

2. The image sensor according to claim 1, wherein the arithmetic operation circuit performs an arithmetic operation of a change amount of the luminance value using the external exposure control information, calculates the gain or the accumulation time corresponding to the change amount.

3. The image sensor according to claim 2, wherein the external exposure control information includes information indicating a timing of an exposure control outside of the image sensor, and
wherein the arithmetic operation circuit performs an arithmetic operation of a change amount of the luminance value when it is determined to be a timing at which the exposure control outside of the image sensor is performed.

4. The image sensor according to claim 3, wherein, when a new target luminance value is received, the arithmetic operation circuit performs an arithmetic operation using the target luminance value even when the exposure control outside of the image sensor is being performed.

5. The image sensor according to claim 1, wherein the external exposure control information includes an aperture control information.

6. The image sensor according to claim 1, wherein the arithmetic operation circuit receives no new target luminance value while the gain circuit or the control circuit performs exposure control of the imaging unit.

7. The image sensor according to claim 1, wherein the arithmetic operation circuit calculates different gain values for each line of the imaging unit to control a setting of the gain circuit.

8. An imaging apparatus comprising:
the image sensor according to claim 1; and
a controller having a processor which executes instructions stored in a memory or having circuitry, the controller being configured to function as
an arithmetic processing unit that transmits the target luminance value, the external exposure control information, and information of an exposure following speed to the image sensor.

9. The imaging apparatus according to claim 8, wherein the arithmetic processing unit acquires control information of an aperture provided in an imaging optical system, detects a luminance value of an object from an image signal acquired by the image sensor, and performs an exposure arithmetic operation.

10. The imaging apparatus according to claim 9, wherein the arithmetic processing unit performs a switching process of switching between first control to perform an exposure arithmetic operation within the image sensor and second control to perform exposure control of the image sensor using a result of an arithmetic operation performed by the arithmetic processing unit.

11. The imaging apparatus according to claim 10, wherein the arithmetic processing unit performs a process of switching to the first control when a processing load amount is greater than or equal to a threshold value and to the second control when the processing load amount is less than the threshold value.

12. The imaging apparatus according to claim 9, wherein the arithmetic processing unit performs control using first control to perform an exposure arithmetic operation within the image sensor and second control to perform exposure control of the image sensor using a result of an arithmetic operation performed by the arithmetic processing unit in combination.

13. The image sensor according to claim 1, wherein the imaging unit is arranged on a first substrate of the image sensor and the arithmetic operation circuit, the gain circuit, and the control circuit are arranged on a second semiconductor substrate of the image sensor.

14. An imaging apparatus comprising:
the image sensor according to claim 1; and
a controller configured to switch the imaging apparatus between (i) a first control mode in which an exposure arithmetic operation is performed within the image sensor; and (ii) a second control mode in which the controller performs an arithmetic operation and exposure control of the image sensor based on the arithmetic operation performed by the controller.

15. The image sensor according to claim 1, wherein a plurality of semiconductor substrates are stacked on each other, the imaging unit is arranged on a first semiconductor substrate, and the arithmetic operation circuit is arranged on a second semiconductor substrate which is different from the first semiconductor substrate.

* * * * *